Patented Jan. 2, 1934

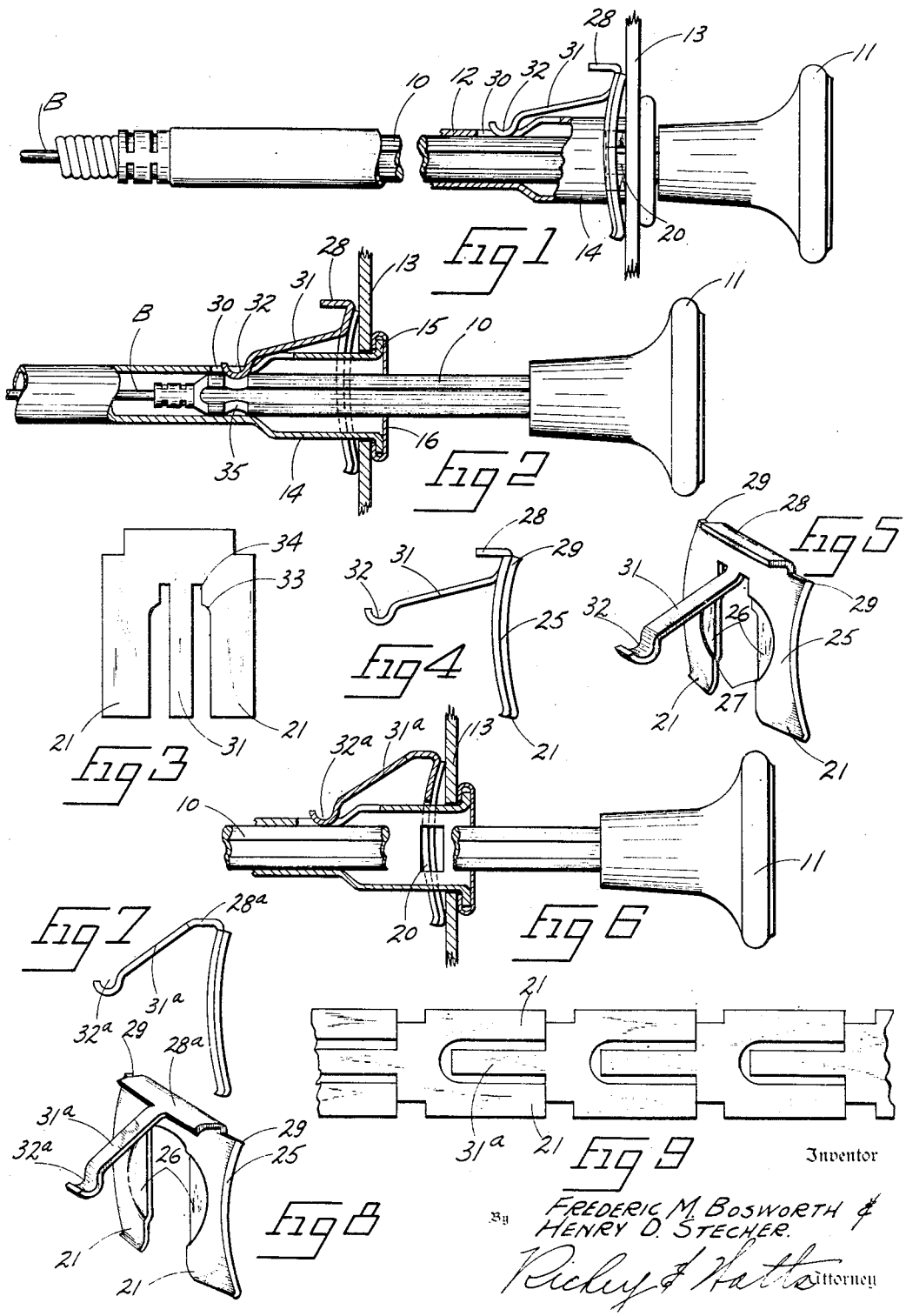

1,942,273

UNITED STATES PATENT OFFICE 1,942,273

CONTROL DEVICE

Frederic M. Bosworth, Rocky River, and Henry D. Stecher, Lakewood, Ohio, assignors to The Weatherhead Company, Cleveland, Ohio, a corporation of Ohio Application August 30, 1932. Serial No. 631,062

10 Claims. (Cl. 74—39)

This invention relates in one sense to an improvement in the Securing means disclosed and claimed in the copending application of John D. Baldwin, Jr., Serial No. 449,343, filed May 2, 1930, and in another sense to a control device whose advantages can be illustrated and described in referring to such a device adapted to be mounted on the instrument panel of a motor car for operating such instrumentalities as the choke, carburetor heat control, free wheeling control, or other similar devices. However, it is to be understood that the device is not limited in its application for use in connection with automotive vehicles, but may be employed in other capacities and environments if desired.

The free wheeling, choke, carburetor heat controls and similar devices are ordinarily operated by a reciprocated rod passing through the instrument panel of the automobile and which may be pulled out or pushed in to operate the various instrumentalities, the rod ordinarily being connected to the device which is controlled by means of a Bowden wire or other flexible control. It is desirable in connection with such controls to apply friction to the rod so that the rod will be retained in its various adjusted positions. In some cases, for example in connection with the choke control, the frictional resistance to the movement of the rod is sought to be kept uniform throughout the length of its movement. In other cases, as for example in a free wheeling control, it is desirable to increase the resistance to movement of the rod at one or more points or to limit its travel at such point or points.

Accordingly, a general object of our invention is to provide a simple, efficient, and effective device for applying frictional resistance to a reciprocable control element. Another object is to provide such a device which can be easily and economically manufactured and assembled. A further object is to provide a control device in which the reciprocable element will be firmly held in one or more definite positions of adjustment. A further object of our invention is to provide a clip or securing device which is adapted to secure the control assembly to the instrument panel and at the same time to apply frictional or other resistance to the reciprocable rod.

Other objects and advantages of our invention will become apparent to those skilled in the art from the following description of various forms thereof, reference being had to the accompanying drawing wherein:—

Figure 1 is a side elevation, partly in section, showing one form of our clip in conjunction with a control device; Fig. 2 is a longitudinal section through the structure shown in Fig. 1, illustrating the control rod in a different position; Fig. 3 is a plan view of the securing clip in one stage of the manufacturing process; Fig. 4 is a side view of the completed securing clip; Fig. 5 is a perspective view of the clip; Fig. 6 is a longitudinal section through a modified form of our invention; Fig. 7 is a side view of the modified clip of Fig. 6; Fig. 8 is a perspective of the same clip; Fig. 9 illustrates a plan for severing the last clip from blank stock.

To illustrate a preferred form and a modification of our invention we show it in connection with a choke or free wheeling control assembly in which the operation and functions of the parts can be conveniently described and understood. Other applications of the principles and advantages of our invention will become apparent to those skilled in the art without further illustration of different uses and environments.

Referring to Figs. 1 to 5 of the drawing which illustrate a preferred form of our invention, the control rod 10 may be connected at one of its ends to a flexible cable such as the Bowden wire B and at the other end it may be provided with a knob 11 so that it may be conveniently operated. The rod is mounted for reciprocable movement within the escutcheon tube 12 which has an interior diameter throughout the greater portion of its length just slightly greater than the diameter of the control rod. In order to provide a larger bearing surface and a firmer support for the escutcheon tube in the instrument board or other panel 13, one end of the escutcheon tube is preferably flared outwardly as at 14. The outwardly flared end of the tube may be flanged over as at 15 and an apertured cap 16 may be secured to the flanged end which is adapted to engage the outer face of the instrument panel and thus to prevent the tube from being drawn through the aperture in the panel. The escutcheon tube described above is similar to the escutcheon tube disclosed in the copending application of Albert J. Weatherhead, Jr., Serial No. 556,736, filed August 13, 1931.

To secure the tube in position on the panel, the enlarged portion 14 thereof is preferably slotted as at 20 to receive the legs 21 of an arched resilient clip, indicated generally by the reference character 25. The clip in some respects, and particularly in so far as the matter of securing the escutcheon tube to the instrument panel is concerned, is similar to the securing device described and claimed in the John D. Baldwin, Jr.

application above referred to. In order to prevent the clip from being displaced from engagement with the escutcheon tube, the legs 21 of the clip may be provided with depressed seat portions 26 which engage the faces of the slots in the escutcheon tube and which provide projections or humps adjacent the seat portions that engage the walls of the escutcheon tube. To aid in the application of the clip, the rear end thereof may be bent substantially at right angles to the general plane of the clip to form an upstanding flange 28, and in order to prevent the clip from rotating while in engagement with the instrument panel, the rear corners may be turned downwardly to form spurs 29 which will score the instrument panel and thus assist in holding the clip in position and in proper frictional engagement with the control rod.

In order to apply frictional resistance to the control rod 10, the escutcheon tube 12 is preferably apertured as at 30 and the clip 25 is preferably provided with a central resilient finger 31 which projects away from the general plane of the clip and extends alongside of the escutcheon tube. The resilient finger 31 may be provided with a curved end portion as at 32 which is adapted to project through aperture 30 and engage the control rod 10. It will be seen that when the clip 25 is inserted in the slots 20 of the escutcheon tube that the peripheral portion of the clip will bear against the rear face of the instrument panel and thus firmly hold the escutcheon tube in position and that at the same time the curved end 32 of the central finger will project through the aperture 30 and frictionally engage the control rod. Thus by one assembly operation, the escutcheon tube can be firmly secured in place and the required frictional resistance applied to the control rod.

In forming the clip, we prefer to start with the blank shown in Fig. 3 which may be stamped from a strip of sheet metal. It will be noted that the legs 21 on the opposite sides of the slot are provided with inwardly extending curved shoulder portions indicated at 33. These shoulders are adapted to engage the exterior of the escutcheon tube when the clip is applied and thereby to definitely locate the clip with respect to the escutcheon tube. It is important that the clip be properly positioned with respect to the escutcheon tube so that the desired amount of frictional resistance will be applied by the resilient finger. Obviously, if the clip were pushed too far onto the escutcheon tube, the resistance would be greater than desired.

In order to secure sufficient resilience in the central resilient finger 31, I prefer to cut away the metal in back of the shoulders 33, as indicated at 34. By this operation, the length and resiliency of the central finger are increased. After the blanks have been formed as shown in Fig. 3, the clip may be completed by forming it into the configuration illustrated in Figs. 4 and 5 and thereafter hardening the clip by any convenient method.

If it is desired to establish a definite position of adjustment of the control, as is usual in the case of free wheel controls, we preferably form an annular recess in the control rod, as indicated at 35. As shown in Fig. 2, when the rod is pulled out to its adjusted position, the end 32 of the resilient finger will spring inwardly into the annular recess and thus form a definite locating stop. However, it is to be understood that our device can also be used to apply a substantially uniform frictional resistance to the movement of the rod throughout the length of movement and also that a plurality of definite stops can be provided.

In Figs. 6 to 9, inclusive, we illustrate a modified form of our invention in which the resilient finger 31a projects away from the rear flange 28a. The general construction of the clip in this modification, except for the location of the resilient finger, is identical with the clip described with reference to Figs. 1 to 5, and the application and operation of the device are substantially the same as the first described form. As shown in Fig. 6, the curved end portion 32a of the clip is adapted frictionally to engage the control rod 10 and obviously this modified form of clip can be employed either with or without an annular recess in the control rod to form a definite locating stop.

In Fig. 9, we have illustrated a convenient method of stamping the modified form of clip from a strip of metal. It will be seen that the central fingers 31a are formed from material which is removed from between the opposite legs of the clip and thus there is very little waste material.

From the foregoing description of preferred forms of our invention, it will be seen that we have provided an extremely simple and effective controlling and securing device which can be economically manufactured. It will also be seen that with our invention, the assembly operation can be carried out very rapidly, it only being necessary to insert the escutcheon tube through the dash board and apply our clip thereto to simultaneously secure the escutcheon tube in place and provide for the frictional resistance to the movement of the control rod. It will further be seen that our clips can be manufactured economically with a minimum waste of material.

While we have described preferred forms of our invention, it will be appreciated that our invention has many uses and applications besides those described in detail herein. Likewise, various modifications and changes will be apparent to persons skilled in the art and it is to be understood that our invention is not limited to the particular forms or applications illustrated and described herein or in any manner other than by the scope of the appended claims when given the range of equivalents to which our patent may be entitled.

We claim:—

1. A controlling device comprising in combination, a hollow sleeve adapted to be secured to an apertured plate, said sleeve having slots therein adapted to be disposed on one side of the plate, and a lateral aperture adapted to be disposed on the same side of the plate, a control rod reciprocable in said sleeve and having a recessed portion, and a resilient clip having a base portion adapted to engage the plate, spaced legs adapted to engage the slots in the sleeve to secure the sleeve to the plate, a central finger projecting away from the general plane of the clip and adapted to project through said lateral aperture and resiliently to engage the recessed portion of the rod to retain the rod in a definite position, and a projection adjacent the slot to retain the clip in engagement with the sleeve.

2. A controlling device comprising in combination, a hollow sleeve adapted to be secured to an apertured plate, said sleeve having a slotted wall, a control rod reciprocable in said sleeve, and a resilient clip having a base portion adapted to engage the plate, spaced legs adapted to engage faces of the slots in the sleeve to secure the sleeve to the plate, a central finger projecting away from the general plane of the clip and adapted resiliently to engage the rod to frictionally retain the rod in any position, and a hump adjacent the slot to retain the clip in engagement with the sleeve.

3. A controlling device comprising in combination, a hollow sleeve adapted to be secured to an apertured plate, said sleeve having a slotted wall, a control rod reciprocable in said sleeve, and a resilient clip having a base portion adapted to engage the plate, spaced legs adapted to engage the faces of the slots in the sleeve to secure the sleeve to the plate, and a central finger projecting away from the general plane of the clip and adapted resiliently to engage the rod.

4. A securing and controlling device comprising an arched resilient clip having a base portion, a slot, spaced legs, a seat portion disposed adjacent the slot and centrally of the clip, a sharp point on the base portion, and a resilient finger extending away from the general plane of the clip and adapted to frictionally engage a reciprocable member.

5. A U-shaped clip having spaced legs adapted to engage opposite sides of a fixed member and having a portion between the legs for engaging another part of said fixed member and having a resilient finger extending upwardly from the closed end of the clip at an angle to the legs thereof, said finger having a tip adapted to frictionally engage a member reciprocable relative to said first named member.

6. A clip for securing a tubular guiding part to a planular member and for controlling movement of a reciprocal member in said guiding part, said clip having a body portion engaging the tubular part, and extending generally at right angles to said tubular guiding part and having a resilient integrally formed central finger extending from the body part at an angle thereto and contacting with said reciprocal member.

7. A U-shaped clip having a pair of spaced legs adapted to engage a fixed member and extend generally at right angles thereto and having a third member extending from the base of the U at an angle to said legs and adapted to engage a reciprocal member lying within said first named member.

8. A clip for attaching and securing a control device and for regulating movement of one of the elements thereof, comprising a resilient body portion engaging and extending generally at right angles to said device and a resilient finger extending generally parallel to said device and contacting with the said movable element.

9. A controlling device comprising in combination, a hollow sleeve adapted to be secured to an apertured plate, said sleeve having a slotted wall, a control rod reciprocable in said sleeve, and a resilient clip having a base portion adapted to engage the plate, spaced legs adapted to engage the faces of the slots in the sleeve to secure the sleeve to the plate, an upstanding flange adjacent the base portion, and a finger projecting from said flange and adapted resiliently to engage the rod.

10. A controlling device comprising in combination, a hollow sleeve adapted to be secured to an apertured plate, said sleeve having a slotted wall and a lateral aperture, a control rod reciprocable in said sleeve and having a recessed portion, and a resilient clip having a base portion adapted to engage the plate, spaced legs adapted to engage the faces of the slots in the sleeve to secure the sleeve to the plate, an upstanding flange adjacent the base portion, and a finger projecting from said flange and adapted to project through said lateral aperture and to resiliently engage the recessed portion of the rod to retain the rod in a definite position.

FREDERIC M. BOSWORTH.
HENRY D. STECHER.